United States Patent
Kojiya et al.

(10) Patent No.: US 9,479,107 B2
(45) Date of Patent: Oct. 25, 2016

(54) OVER TEMPERATURE PROTECTION DEVICE FOR ELECTRIC MOTORS

(75) Inventors: Tomohiro Kojiya, Tokyo (JP); Yuruki Okada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 72 days.

(21) Appl. No.: 14/343,492

(22) PCT Filed: Sep. 8, 2011

(86) PCT No.: PCT/JP2011/070501
§ 371 (c)(1),
(2), (4) Date: Mar. 7, 2014

(87) PCT Pub. No.: WO2013/035185
PCT Pub. Date: Mar. 14, 2013

(65) Prior Publication Data
US 2014/0197769 A1    Jul. 17, 2014

(51) Int. Cl.
| | |
|---|---|
| *B62D 5/04* | (2006.01) |
| *H02P 29/00* | (2016.01) |
| *H02P 27/04* | (2016.01) |
| *H02P 5/50* | (2016.01) |
| *B60L 3/00* | (2006.01) |
| *H02P 29/02* | (2016.01) |

(52) U.S. Cl.
CPC ......... *H02P 29/0044* (2013.01); *B60L 3/0061* (2013.01); *H02P 5/50* (2013.01); *H02P 27/047* (2013.01); *H02P 29/0055* (2013.01);
(Continued)

(58) Field of Classification Search
USPC .............................. 318/490; 361/24; 180/446
See application file for complete search history.

(56) References Cited

U.S. PATENT DOCUMENTS

| 5,473,225 A | 12/1995 | Miyazaki |
| 6,690,139 B1 * | 2/2004 | Seibel ........................... 318/798 |

(Continued)

FOREIGN PATENT DOCUMENTS

| EP | 0 546 981 A2 | 6/1993 | |
| EP | 0546981 A2 * | 6/1993 | ........... H02H 7/0833 |

(Continued)

OTHER PUBLICATIONS

International Search Report (PCT/ISA/210) mailed on Dec. 13, 2011, by the Japanese Patent Office as the International Searching Authority for International Application No. PCT/JP2011/070501.

(Continued)

*Primary Examiner* — Eduardo Colon Santana
*Assistant Examiner* — Cortez Cook
(74) *Attorney, Agent, or Firm* — Buchanan Ingersoll & Rooney PC

(57) ABSTRACT

An over temperature protection device for electric motors applicable to a railway vehicle driving system that operates a plurality of electric motors in parallel using one or a plurality of inverter devices includes a control device configured to control the operation of an inverter device and a protecting device configured to detect, on the basis of a frequency fs including frequency information at the time when the inverter device is applying control for fixing a ratio of a voltage and a frequency to electric motors and electric currents of at least one phase flowing to the electronic motors, an over temperature that could occur in the electric motors, to generate an over temperature protection signal Tf for protecting the electric motors from the over temperature, and to output the over temperature protection signal Tf to the control device.

5 Claims, 4 Drawing Sheets

(52) U.S. Cl.
CPC ........... *H02P29/027* (2013.01); *H02P 29/032* (2016.02); *B60L 2200/26* (2013.01); *B60L 2220/42* (2013.01); *H02P 2207/01* (2013.01); *Y02T 10/648* (2013.01)

(56) References Cited

U.S. PATENT DOCUMENTS

| | | | |
|---|---|---|---|
| 2005/0110450 A1* | 5/2005 | Stancu | H02P 6/183 318/609 |
| 2008/0094762 A1* | 4/2008 | Ochiai | 361/24 |
| 2012/0245776 A1 | 9/2012 | Okada et al. | |

FOREIGN PATENT DOCUMENTS

| | | |
|---|---|---|
| JP | 58-22801 U | 2/1983 |
| JP | 64-54799 U | 4/1989 |
| JP | 6-54440 A | 2/1994 |
| JP | 7-194186 A | 7/1995 |
| JP | 07194186 A * | 7/1995 |
| WO | 2011/071014 A1 | 6/2011 |

OTHER PUBLICATIONS

Written Opinion (PCT/ISA/237) mailed on Dec. 13, 2011, by the Japanese Patent Office as the International Searching Authority for International Application No. PCT/JP2011/070501.

Office Action of corresponding Japanese application No. 2012-509799 mailed Apr. 10, 2012 with English translation.

Extended European Search Report issued on May 7, 2015, by the European Patent Office in corresponding European Patent Application No. 11872110.9-1806 (7 pages).

Partial English translation of Office Action issued on May 24, 2016, by the State Intellectual Property Office of China in corresponding Chinese Application No. 201180073309.8. (9 pages).

* cited by examiner

OVER TEMPERATURE PROTECTION DEVICE FOR ELECTRIC MOTORS

FIELD

The present invention relates to an over temperature protection device for electric motors.

BACKGROUND

In a system for driving a railway vehicle (a railway vehicle driving system), a plurality of electric motors (alternating-current electric motors) are operated in parallel using one or a plurality of inverter devices.

To detect abnormalities of a plurality of electric motors, an electric motor parallel operation system disclosed in Patent Literature 1, which is not a technology applied to the railway vehicle driving system, always grasps a differential current among the electric motors and, when the differential current is equal to or larger than a setting value, determines that some abnormality has occurred and generates an abnormality signal.

CITATION LIST

Patent Literature

Patent Literature 1: Japanese Patent Application Laid-Open No. H7-194186 ("0008", FIG. 1)

SUMMARY

Technical Problem

However, for example, when an abnormality detecting function for detecting abnormalities using the differential current among the electric motors is incorporated in the railway vehicle driving system as an over temperature protection function, a difference in wheel diameters among wheels coupled to electric motors for railway vehicles (hereinafter simply referred to as "electric motors" except when the electric motors for railway vehicles are particularly distinguished) poses a problem. For example, when the difference in the wheel diameters is conspicuous, even if the electric motors are driven at the same torque, a large current flows to the electric motors on a side where the wheels having a large wheel diameter are driven and a small current flows to the electric motors on a side where the wheels having a small wheel diameter are driven. Therefore, when a setting value (a threshold) for determining the magnitude of the differential current is determined in advance, the setting value has to be set in advance taking into account an allowed difference in the wheel diameters. There is a problem in that accurate determination cannot be performed.

The present invention has been devised in view of the above and it is an object of the present invention to provide an over temperature protection device for electric motors that can perform, even when a significant difference is present in wheel diameters among wheels coupled to the electric motor, highly-accurate over temperature protection without being substantially affected by the difference in the wheel diameters.

Solution to Problem

In order to solve the above problems and achieve the object, the present invention is an over temperature protection device for electric motors applicable to a railway vehicle driving system that operates a plurality of electric motors in parallel using one or a plurality of inverter devices, the over temperature protection device including a control device configured to control an operation of the inverter device; and a protecting device configured to detect, on the basis of information concerning the frequency at the time when the inverter device is applying control for fixing the ratio of a voltage and a frequency to the electric motors and a current detection value of at least one phase flowing to the electronic motors, an over temperature that could occur in the electric motors, to generate an over temperature protection signal for protecting the electric motors from the over temperature, and to output the over temperature protection signal to the control device.

Advantageous Effects of Invention

With the over temperature protection device for electric motors according to the present invention, there is an effect that it is possible to perform, even when a significant difference is present in wheel diameters among wheels coupled to the electric motors, highly-accurate over temperature protection without being substantially affected by the difference in the wheel diameters.

DESCRIPTION OF EMBODIMENTS

An over temperature protection device for electric motors according to an embodiment of the present invention is explained below with reference to the accompanying drawings. Note that the present invention is not limited by an embodiment explained below.

Embodiment

Figure 1:
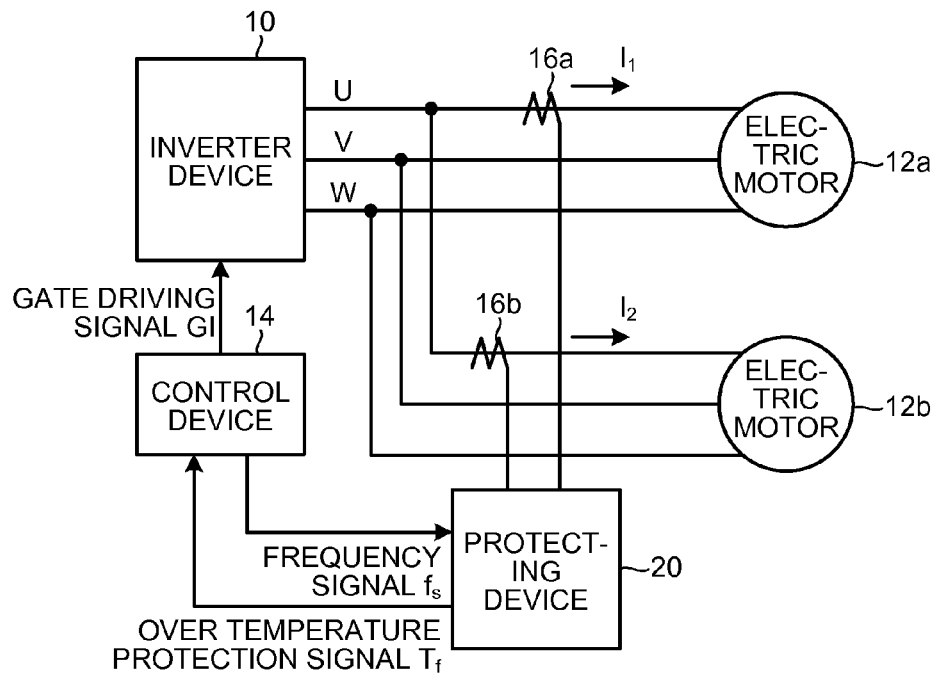
FIG. 1 is a diagram of the configuration of a main part of a railway vehicle driving system including an over temperature protection device for electric motors according to an embodiment.

FIG. 1 is a diagram of the configuration of a main part of a railway vehicle driving system including an over temperature protection device for electric motors according to an embodiment. The railway vehicle driving system according to this embodiment includes, as shown in the figure, an inverter device 10, electric motors 12a and 12b, a control device 14 and a protecting device 20.

The control device 14 generates a gate driving signal GI for controlling a not-shown switching element provided in the inverter device 10 and outputs the gate driving signal GI to the inverter device 10. The inverter device 10 drives, based on the gate driving signal GI output from the control device 14, the electric motors 12a and 12b illustrated as an example of a plurality of electric motors. In at least one phase (in the figure, a U phase is illustrated) among connection conductors of U, V, and W phases that connect the inverter device 10 and the electric motors 12a and 12b, current detectors 16a and 16b are provided. Of the current detectors 16a and 16b, the current detector 16a detects an electric current $I_1$ flowing in the U phase of the electric motor 12a and the current detector 16b detects an electric current $I_2$ flowing in the U phase of the electric motor 12b. Note that the electric currents $I_1$ and $I_2$ detected by the current detectors 16a and 16b are input to the protecting device 20.

A frequency signal $f_s$ from the control device 14 is also input to the protecting device 20. The frequency signal $f_s$ is a signal including information concerning a frequency (an inverter frequency) at the time when the inverter device 10 applies control (V/f fixed control) for fixing a ratio of a voltage and a frequency to the electric motors 12a and 12b. The protecting device 20 detects, based on the electric currents $I_1$ and $I_2$ and the frequency signal $f_s$ input to the protecting device 20, an over temperature that could occur in the electric motors 12a and 12b.

Figure 2:
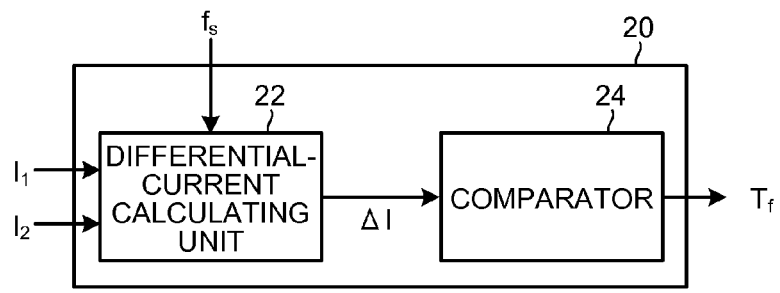
FIG. 2 is a functional block diagram of the internal configuration of the protection device shown in FIG. 1.

FIG. 2 is a functional block diagram of the internal configuration of the protecting device 20 shown in FIG. 1. The protecting device 20 includes, as shown in the figure, a differential-current calculating unit 22 and a comparator 24 functioning as an over-temperature-protection-signal generating unit. The electric currents $I_1$ and $I_2$ and the frequency signal $f_s$ are input to the differential-current calculating unit 22. When a frequency included in the frequency signal $f_s$ is smaller than a specified value set in advance, the differential-current calculating unit 22 calculates a differential current $\Delta I$ ($=|I_1-I_2|$) between the electric current $I_1$ and the electric current $I_2$ and outputs the differential current $\Delta I$ ($=|I_1-I_2|$) to the comparator 24. When the differential current $\Delta I$ is larger than the specified value set in advance, the comparator 24 determines that that one of the electric motors 12a and 12b is likely to reach an over temperature, generates an over temperature protection signal $T_f$, and outputs the over temperature protection signal $T_f$ to the control device 14. The control device 14 that has received the over temperature protection signal $T_f$, for example, stops the operation of the inverter device 10 so as to protect the electric motors 12a and 12b.

With the function of the over temperature protection device, there is an advantage that it is possible to perform over temperature protection without providing a temperature sensor. In a method of performing the over temperature protection using detection information of the temperature sensor, it is necessary to provide temperature sensors equivalent to the number of electric motors. An increase in the number of components and an increase in maintenance cost are caused. However, in the over temperature protection device in this embodiment, because it is unnecessary to provide any temperature sensor, it is possible to suppress the increase in costs.

Note that, in FIG. 2, the configuration for inputting the frequency signal $f_s$ to the differential-current calculating unit 22 is disclosed. However, a configuration for inputting the frequency signal $f_s$ to the comparator 24 can be adopted. In the case of this configuration, the differential-current calculating unit 22 always calculates and outputs the differential current $\Delta I$ between the electric current $I_1$ and the electric current $I_2$. On the other hand, when the differential current $\Delta I$ is larger than the specified value set in advance and the frequency included in the frequency signal $f_s$ is smaller than the specified value set in advance, the comparator 24 determines that one of the electric motors 12a and 12b has possibly reached an over temperature, generates the over temperature protection signal $T_f$, and outputs the over temperature protection signal $T_f$ to the control device 14. The subsequent operations are as explained above.

Figure 3:
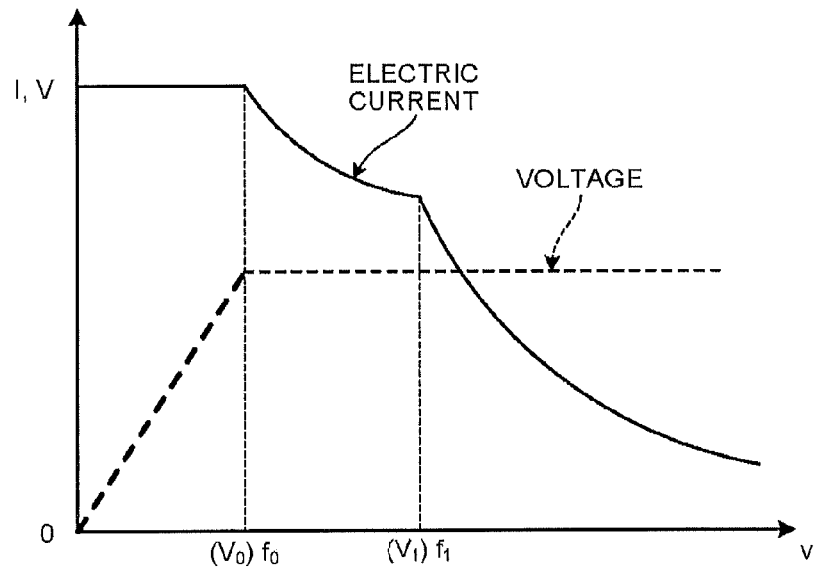
FIG. 3 is a diagram of an example of an accelerating force characteristic of electric motors for railway vehicles.
Figure 4:
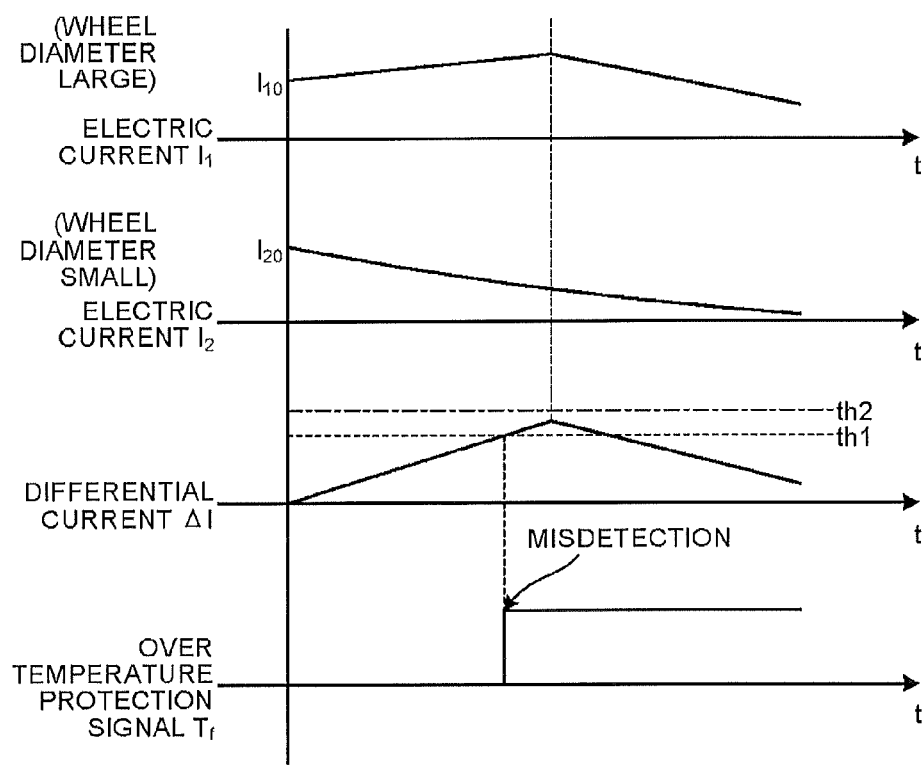
FIG. 4 is a time chart for explaining misdetection that could occur when a significant difference is present in wheel diameters among wheels.
Figure 5:
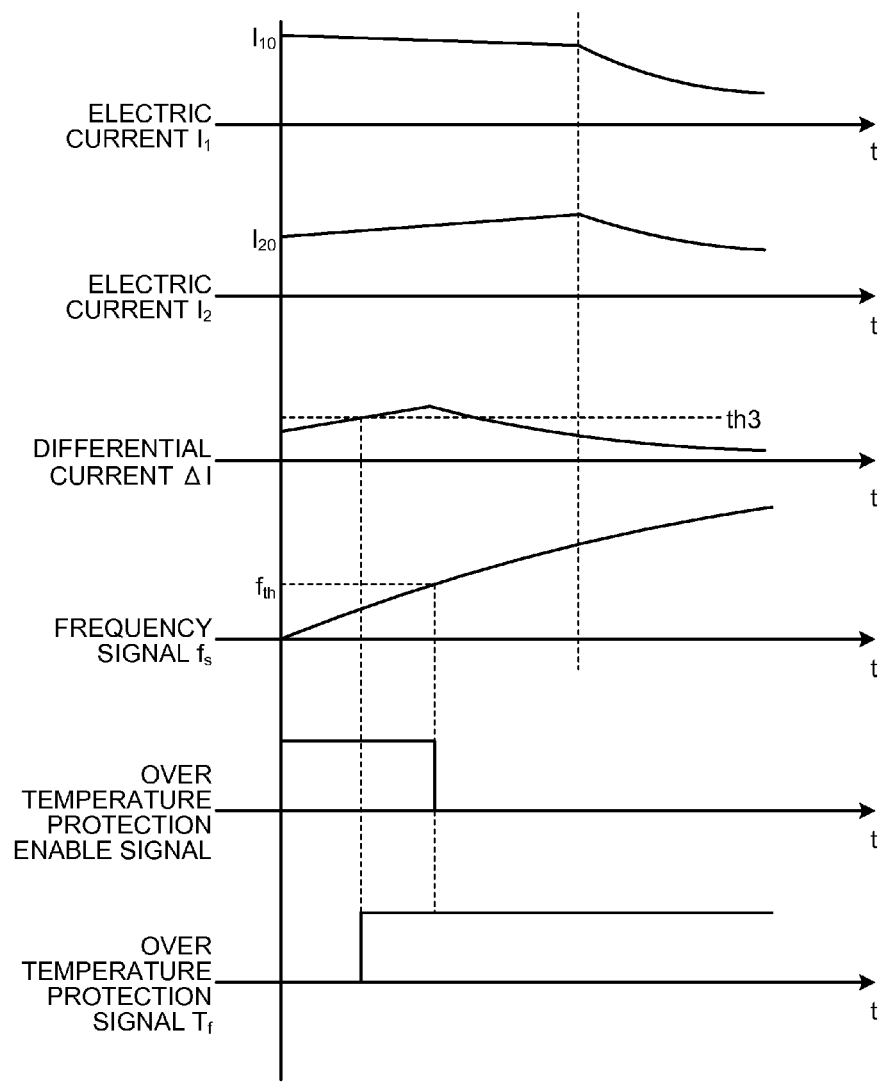
FIG. 5 is a time chart for explaining the operation of the over temperature protection device according to the embodiment for suppressing the occurrence of misdetection even when a significant difference is present in wheel diameters among wheels.
Figure 6:
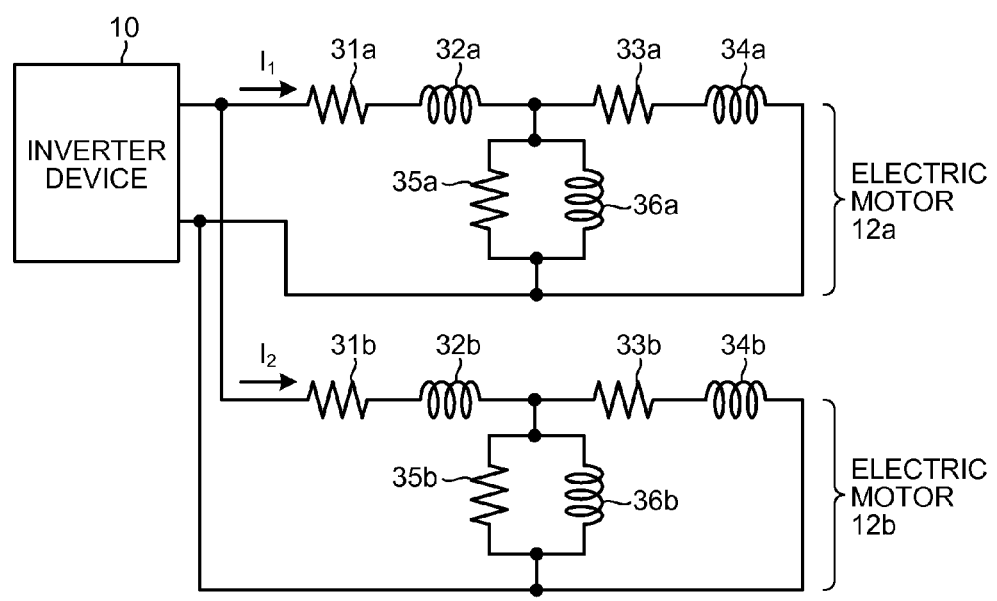
FIG. 6 is a circuit diagram of an equivalent circuit for one phase on the electric motors side in the railway vehicle driving system.

Effects peculiar to the over temperature protection device in this embodiment are explained with reference to FIGS. 3 to 6. FIG. 3 is a diagram of an example of an accelerating force characteristic of the electric motors for railway vehicles. FIG. 4 is a time chart for explaining misdetection that could occur when a significant difference is present in wheel diameters among wheels coupled to the electric motors. FIG. 5 is a time chart for explaining the operation of the over temperature protection device according to the embodiment for suppressing the occurrence of misdetection even when a significant difference is present in wheel diameters among wheels. FIG. 6 is a circuit diagram of an equivalent circuit for one phase on the electric motors side in the railway vehicle driving system.

In FIG. 3, the abscissa represents vehicle speed (equivalent to the number of revolutions of the electric motor) and the ordinate represents a current command (a solid line waveform) and a voltage command (a broken line waveform). In the broken line waveform, a portion indicated by a thick broken line shown in the figure is a constant V/f control section (a constant torque driving section), wherein control for increasing an applied voltage to the electric motors according to vehicle speed v (equivalent to a frequency f) is performed. In an example shown in the figure, constant V/f control is performed up to vehicle speed $v_0$ (a frequency $f_0$). After the vehicle speed $v_0$, control for fixing the voltage command and switching a curve for reducing the current command in two stages (in the example shown in the figure, vehicle speed $v_1$ (a frequency $f_1$)) is performed. Note that in the example shown in FIG. 3, the current command is switched in two stages after the vehicle speed $v_0$. However, control for not switching a current command curve at the vehicle speed $v_1$ can be adopted.

A time chart in FIG. 4 is explained. FIG. 4 is a time chart for explaining misdetection that occurs when the control method in this embodiment is not adopted. The abscissa represents time and the ordinate represents, from an upper stage part, the electric current $I_1$, the electric current $I_2$, the differential current $\Delta I$, and the over temperature protection signal $T_f$. Note that an example shown in FIG. 4 is an example in which a wheel diameter of a wheel coupled to the electric motor 12a is larger than a wheel diameter of a wheel coupled to the electric motor 12b.

Electric currents flowing to the electric motors are substantially equal as shown in the figures during startup ($I_{10} \equiv I_{20}$). On the other hand, after the startup, the electric current flowing to the electric motor coupled to the wheel having a large wheel diameter is larger. In the case of a configuration in which one inverter device controls a plurality of electric motors, a current command in terms of the entire electric motors is fixed. Therefore, as shown in the figure, the electric current $I_1$ flowing to the electric motor 12a coupled to the wheel having the large wheel diameter increases. Conversely, the electric current $I_2$ flowing to the electric motor 12b coupled to the wheel having the small wheel diameter decreases. As a result, the differential current $\Delta I$ increases and, when a significant difference is present in the wheel diameters among the wheels, exceeds a setting value th1 of over temperature protection. Therefore, in the idea in the past, in order to suppress the occurrence of misdetection by a differential current assumed in an allowed wheel diameter difference, a setting value th2 of the over temperature protection has to be increased (th2>th1), so that highly accurate over temperature protection (over temperature detection) could not be performed.

A time chart of FIG. 5 is explained. FIG. 5 is a time chart for explaining an operation performed when the control method in this embodiment is adopted. The abscissa represents time and the ordinate represents, from an upper stage part, the electric current $I_1$, the electric current $I_2$, the differential current $\Delta I$, the frequency signal fs, an over temperature protection enable signal, and the over temperature protection signal $T_f$. In an example shown in FIG. 5, it is assumed that a foreign object such as newspaper is caught in an intake port for cooling air (an air intake port) in the electric motor 12a and the temperature of the electric motor 12a rises, leading to over temperature protection. Note that, in FIG. 4 and FIG. 5, the magnitudes of an electric current and a differential current on the ordinate are not always standardized.

An equivalent circuit for one phase on the electric motors side in the railway vehicle driving system according to this embodiment can be represented as shown in FIG. 6. The electric motors 12a and 12b form circuit configurations respectively including primary resistors 31 (31a and 31b), primary inductances 32 (32a and 32b), secondary resistors 33 (33a and 33b), secondary inductances 34 (34a and 34b), combined resistors 35 (35a and 35b), and mutual inductances 36 (36a and 36b).

When a situation is assumed in which the cooling mechanism of the electric motor 12a does not work and the electric motor 12b is heated because of an unexpected foreign object as explained above, a temperature rise of the electric motor 12b is higher than a temperature rise of the electric motor 12a. According to the temperature rise, a temperature rise of the primary resistor 31b of the electric motor 12b is higher than a temperature rise of the primary resistor 31a of the electric motor 12a and a resistance value of the primary resistor 31b is larger than a resistance value of the primary resistor 31a. That is, impedance of the electric motors side viewed from the inverter device 10 is larger in the electric motor 12b. In addition to this point, when the primary inductance 32 and the secondary inductance 34b of the electric motor 12b are larger than the primary inductance 32a and the secondary inductance 34a of the electric motor 12a because of a manufacturing error or the like, the difference between the impedances further increases. As a result, as shown in the upper stage part of FIG. 5, the electric current $I_1$ flowing to the electric motor 12a is larger than the electric current $I_2$ flowing to the electric motor 12b and the differential current $\Delta I$ rises.

On the other hand, in the over temperature protection device in this embodiment, an over temperature protection enable signal is internally generated based on frequency information included in the frequency signal $f_s$. In the example shown in FIG. 5, as shown in a lower middle stage part of the figure, a specified value of a frequency is set to $f_{th}$ and the over temperature protection enable signal is set to ON until the frequency reaches $f_{th}$. In the case of the configuration shown in FIG. 2, the over temperature protection enable signal is generated in the differential-current calculating unit 22. Under a state in which the over temperature protection enable signal is generated, the differential-current calculating unit 22 calculates the differential current $\Delta I$ and outputs the differential current $\Delta I$ to the comparator 24. The comparator 24 compares the received differential current $\Delta I$ with a specified value th3 set in advance. When the differential current $\Delta I$ exceeds the specified value th3, the comparator 24 generates and outputs the over temperature protection signal $T_f$.

Note that, when the frequency signal $f_s$ is input to the comparator 24, the over temperature protection enable signal is generated in the comparator 24. In this case, under a state in which the over temperature protection enable signal is generated, the comparator 24 compares the differential current $\Delta I$ received from the differential-current calculating unit 22 with the specified value th3 set in advance. When the differential current $\Delta I$ exceeds the specified value th3, the comparator 24 generates and outputs the over temperature protection signal $T_f$.

In the explanation of the processing explained above, the differential-current calculating unit 22 or the comparator 24 generates the over temperature protection enable signal. However, the over temperature protection enable signal does not always need to be generated. It will be sufficient if it has been grasped whether or not the over temperature protection device is in an over temperature protection enable state.

Referring back to the time chart of FIG. 5, in the case of an event in which an unexpected foreign object is caught and the function of the cooling mechanism of the electric motor is lowered, an increase in the differential current $\Delta I$ is steep. Therefore, the over temperature protection signal $T_f$ is generated while the over temperature protection enable signal is generated.

On the other hand, when the cooling mechanism of the electric motor is normal and a significant difference is present in wheel diameters of the wheels coupled to the electric motor, although an increase ratio of the differential current $\Delta I$ is not large, the differential current $\Delta I$ increases as speed increases. However, when the speed is large, as shown in FIG. 5, the over temperature protection enable signal is not generated. Therefore, when a significant difference is present in the wheel diameters, even if the differential current $\Delta I$ increase in a section where vehicle speed is large, the over temperature protection signal $T_f$ is not generated.

As explained above, with the over temperature protection device in this embodiment, a differential current assumed in the case of an event in which the cooling mechanism of the electric motor does not work is surely detected. On the other hand, the specified value $f_{th}$ of the frequency is set so as not to detect a differential current that could occur when a significant difference is present in wheel diameters. The over temperature protection enable signal is generated using the specified value $f_{th}$ of the frequency set in this way. Therefore, even when a significant difference is present in the wheel diameters among the wheels coupled to the electric motors, it is possible to perform accurate over temperature protection without substantially being affected by the difference in the wheel diameters.

With the over temperature protection device in this embodiment, it is possible to perform over temperature protection without using a temperature sensor. Therefore, it is possible to suppress an increase in the number of components and an increase in the maintenance costs.

With the over temperature protection device in this embodiment, it is possible to reduce a probability of misdetection due to a difference in characteristics of a plurality of electric motors. Therefore, it is possible to improve reliability of the device.

Note that, in the example explained above, in order to simplify the explanation, the one inverter device controls two electric motors. However, the present invention is not limited to this configuration. For example, the present invention can also be applied to a configuration in which one inverter device controls N (N is an integer equal to or larger than 3) electric motors.

Specifically, for example, in the case of a configuration in which one inverter device controls three electric motors, the over temperature protection device only has to calculate, among outputs $I_1$, $I_2$, and $I_3$ of current detectors, for example, a differential current $\Delta I_1 = |I_1 - I_2|$ between the outputs $I_1$ and $I_2$ and a differential current $\Delta I_2 = |I_2 - I_3|$ between the outputs $I_2$ and $I_3$ (or a differential current $\Delta I_2 = |I_1 - I_3|$ between the outputs $I_1$ and $I_3$) and, when at least one of the differential currents $\Delta I_1$ and $\Delta I_2$ exceeds a specified value, to determine that an over temperature could occur in an electric motor group configured from the three electric motors, to generate an over temperature protection signal, and to output the over temperature protection signal to the control device 14.

For example, in the case of a configuration in which one inverter device controls four electric motors, the over temperature protection device only has to calculate, among outputs $I_1$, $I_2$, $I_3$, and $I_4$ of current detectors, for example, a differential current $\Delta I_1 = |I_1 - I_2|$ between the outputs $I_1$ and $I_2$, a differential current $\Delta I_2 = |I_2 - I_3|$ between the outputs $I_2$ and $I_3$, and differential current $\Delta I_3 = |I_3 - I_4|$ between the outputs $I_3$ and $I_4$ (or a differential current $\Delta I_2 = |I_1 - I_3|$ between the outputs $I_1$ and $I_3$ and a differential current $\Delta I_3 = |I_1 - I_4|$ between the outputs $I_1$ and $I_4$) and, when at least one of the differential currents $\Delta I_1$ to $\Delta I_3$ exceeds a specified value, to determine that an over temperature could occur in an electric motor group configured from the four electric motors, to generate an over temperature protection signal, and to output the over temperature protection signal to the control device 14.

That is, in the case of the configuration in which the one inverter device controls the N (N is an integer equal to or larger than 3) electric motors, it is only required that current detectors are provided in at least one phase among connection conductors after branching in the same manner as shown in FIG. 1, wherein the over temperature protection device only has to calculate N−1 differential currents of current detection values of adjacent two outputs among outputs $I_1$, $I_2$, ..., and $I_N$ of the current detectors and, when at least one of N−1 calculated values exceeds a specified value, determine that an over temperature could occur in an electric motor group configured from the N electric motors, to generate an over temperature protection signal, and to output the over temperature protection signal to the control device 14.

In the case of the configuration in which the N electric motors are controlled, the N−1 differential currents to be calculated do not always need to be adjacent differential currents. At least one kind of information concerning the outputs $I_1$, $I_2$, ..., $I_N$ only has to be included in any one of the N−1 calculated values. It is possible to perform over temperature protection for all the electric motors.

In the case of a configuration in which M (M is an integer equal to or larger than 2) inverter devices control N electric motors, the above-mentioned control method only has to be applied to each of electric motor groups driven by one inverter device.

In the configuration shown in FIG. 1, the protecting device 20 is configured as a device independent from the control device 14. However, the function of the protecting device 20 can be incorporated in the control device 14. With such a configuration, it is possible to attain space saving for a control device that controls electric motors for vehicles.

INDUSTRIAL APPLICABILITY

As explained above, the present invention is useful as an over temperature protection device for electric motors for railway vehicles.

REFERENCE SIGNS LIST

10 Inverter device
12a, 12b Electric motors
14 Control device
16a, 16b Current detectors
20 Protecting device
22 Differential-current calculating unit
24 Comparator
31 (31a, 31b) Primary resistors
32 (32a, 32b) Primary inductances
33 (33a, 33b) Secondary resistors
34 (34a, 34b) Secondary inductances
35 (35a, 35b) Combined resistors
36 (36a, 36b) Mutual inductances

The invention claimed is:

1. An over temperature protection device for electric motors applicable to a railway vehicle driving system that operates a plurality of electric motors in parallel using one or a plurality of inverter devices, the over temperature protection device comprising:
a control device configured to control an operation of the inverter device, and controls to stop operation of the inverter device when receiving an over temperature control signal; and
a protecting device configured to:
detect, information concerning a frequency of the time when the inverter device is applying control for fixing the ratio of a voltage and a frequency to the electric motors, and an electric current of at least one phase flowing to the electronic motors;
generate an over temperature protection signal for protecting the electric motors from the over temperature when (i) the information concerning the frequency is lower than a specified frequency value, and (ii) a differential current between electric current detection values flowing to predetermined two electric motors among the electric motors is larger than a specified current value; and,
output the over temperature protection signal to the control device.

2. The over temperature protection device for electric motors according to claim 1, wherein
when the inverter device controls two electric motors, the protecting device includes:
a differential-current calculating unit configured to, when the frequency is smaller than a specified value, calculate the differential current between current detection values flowing to the two electric motors; and
an over-temperature-protection-signal generating unit configured to, when the differential current is larger than the specified current value, determine that one of the two electric motors is likely to reach an over temperature and generate the over temperature protection signal.

3. The over temperature protection device for electric motors according to claim 1, wherein
when the inverter device controls two electric motors, the protecting device includes:

a differential-current calculating unit configured to calculate a differential current between current detection values flowing to the two electric motors; and an over-temperature-protection-signal generating unit configured to, when the differential current is larger than specified current value and the frequency is lower than the specified frequency value, determine that one of the two electric motors is likely to reach an over temperature and generate the over temperature protection signal.

4. The over temperature protection device for electric motors according to claim 1, wherein when the inverter device controls N (N is an integer equal to or larger than 3) electric motors, the protecting device includes:

a differential-current calculating unit configured to, when the frequency is lower than the specified frequency value, calculate N−1 differential currents including at least one of current detection values flowing to the N electric motors; and an over-temperature-protection-signal generating unit configured to, when at least one differential current among the N−1 differential currents is larger than the specified current value, determine that an over temperature could occur in an electric motor group configured from the N electric motors and generate the over temperature protection signal.

5. The over temperature protection device for electric motors according to claim 1, wherein when the inverter device controls N (N is an integer equal to or larger than 3) electric motors, the protecting device includes:

a differential-current calculating unit configured to calculate N−1 differential currents including at least one of current detection values flowing to the N electric motors; and an over-temperature-protection-signal generating unit configured to, when at least one differential current among the N−1 differential currents is larger than the specified current value and the frequency is lower than the specified frequency value, determine that an over temperature could occur in an electric motor group configured from the N electric motors and generate the over temperature protection signal.

* * * * *